Aug. 25, 1942.  E. S. GUTTMANN  2,293,730
MEASURING DEVICE
Filed July 3, 1941  5 Sheets-Sheet 1
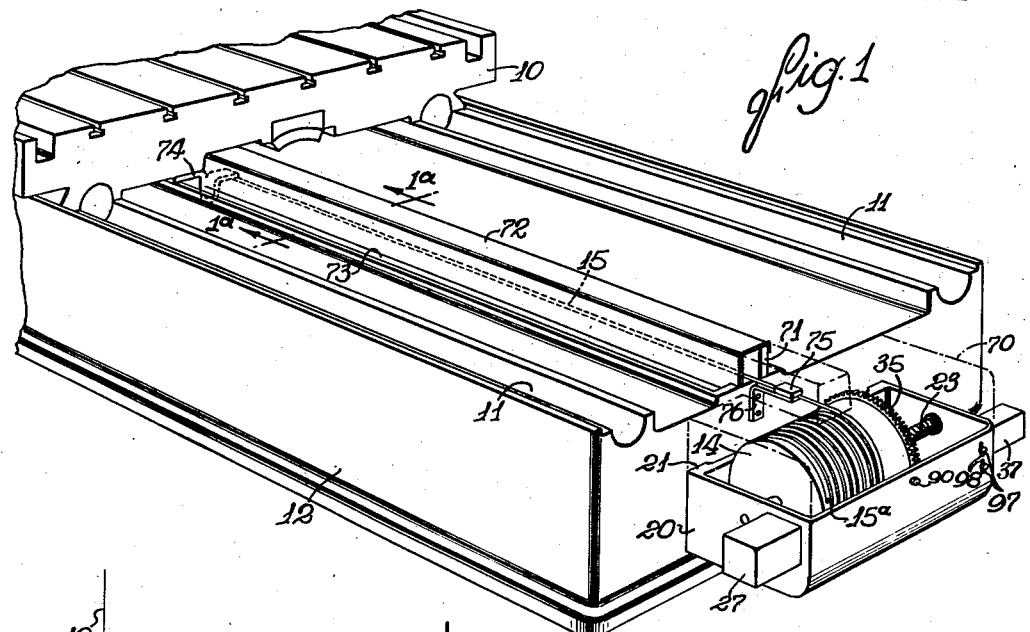
Fig. 1
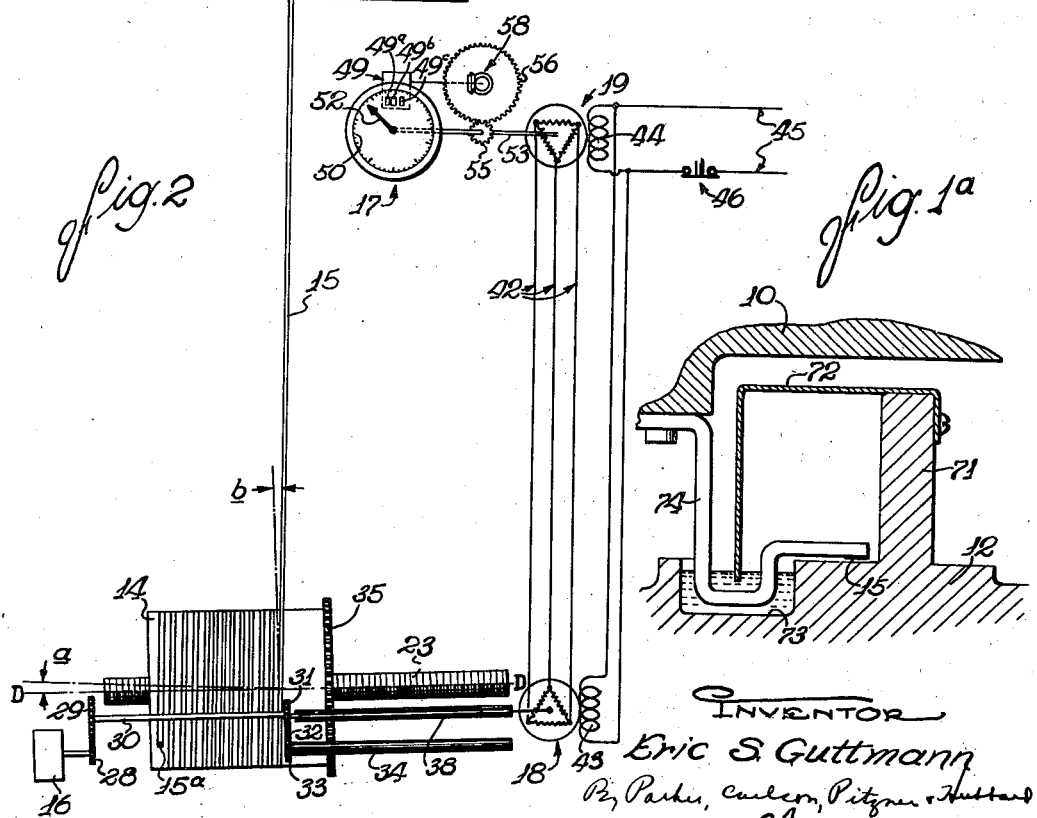
Fig. 2
Fig. 1a
INVENTOR
Eric S. Guttmann
By Parker, Carlson, Pitzner & Hubbard
ATTORNEYS Aug. 25, 1942.  E. S. GUTTMANN  2,293,730
MEASURING DEVICE
Filed July 3, 1941  5 Sheets-Sheet 2
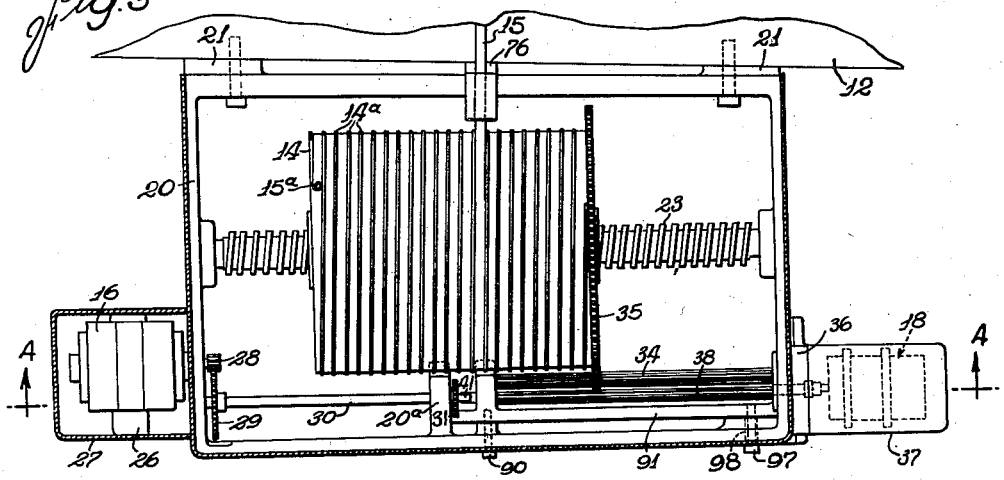
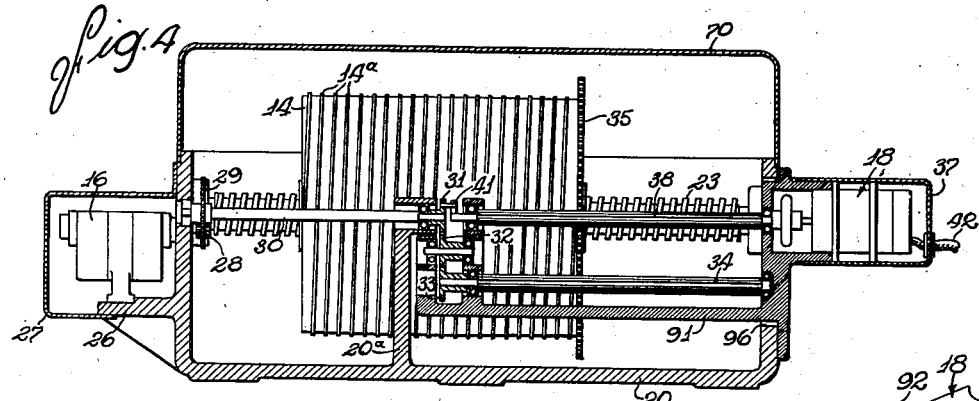
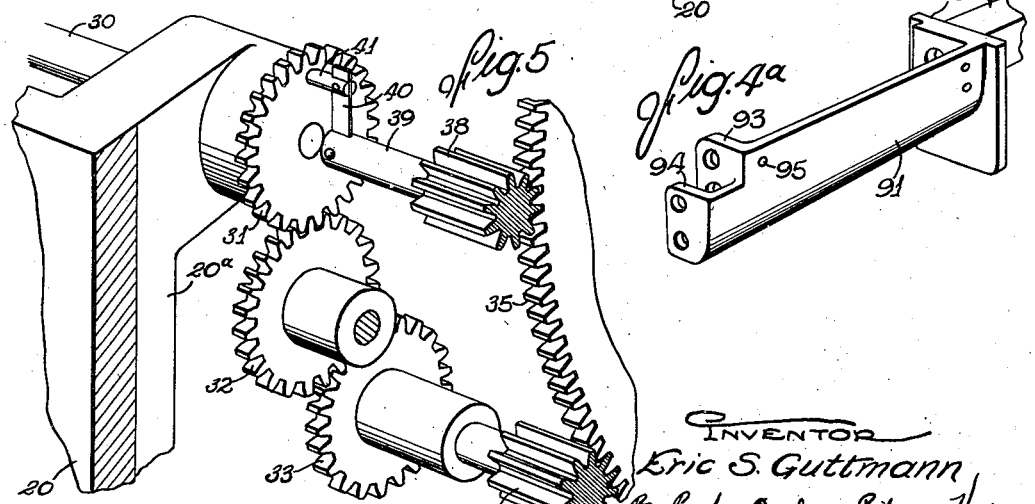
INVENTOR
Eric S. Guttmann
ATTORNEYS Aug. 25, 1942.                E. S. GUTTMANN                2,293,730
                              MEASURING DEVICE
                            Filed July 3, 1941            5 Sheets-Sheet 3
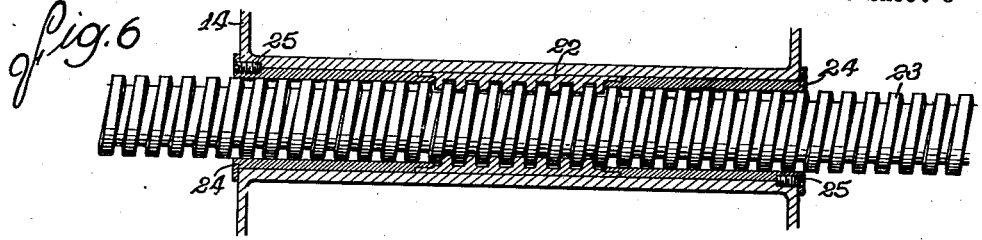
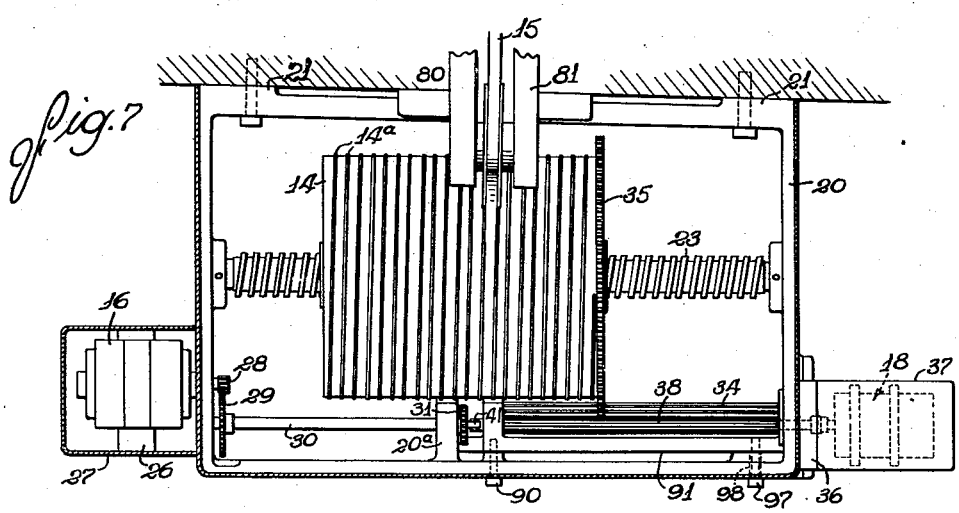
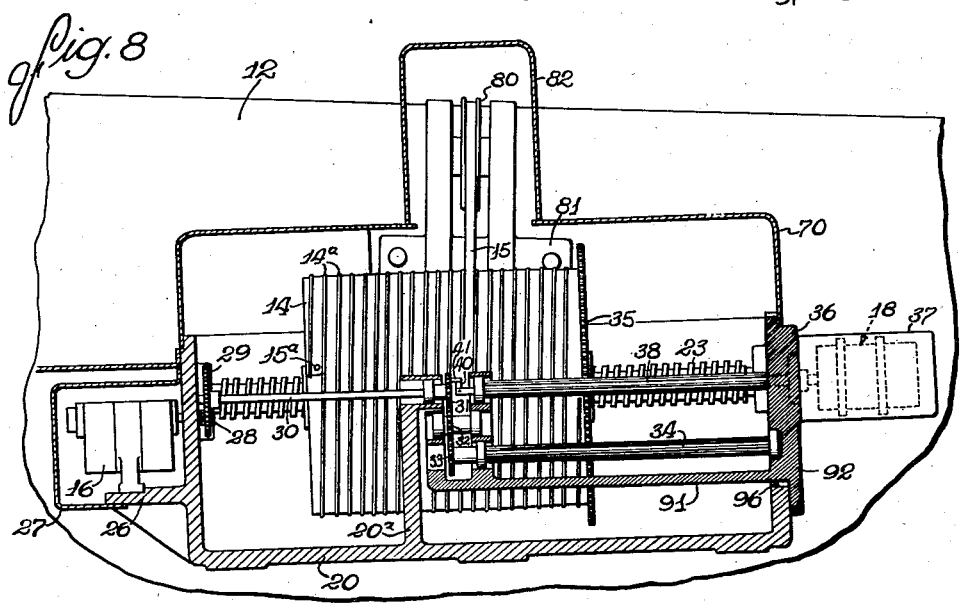
INVENTOR
Eric S. Guttmann
ATTORNEYS

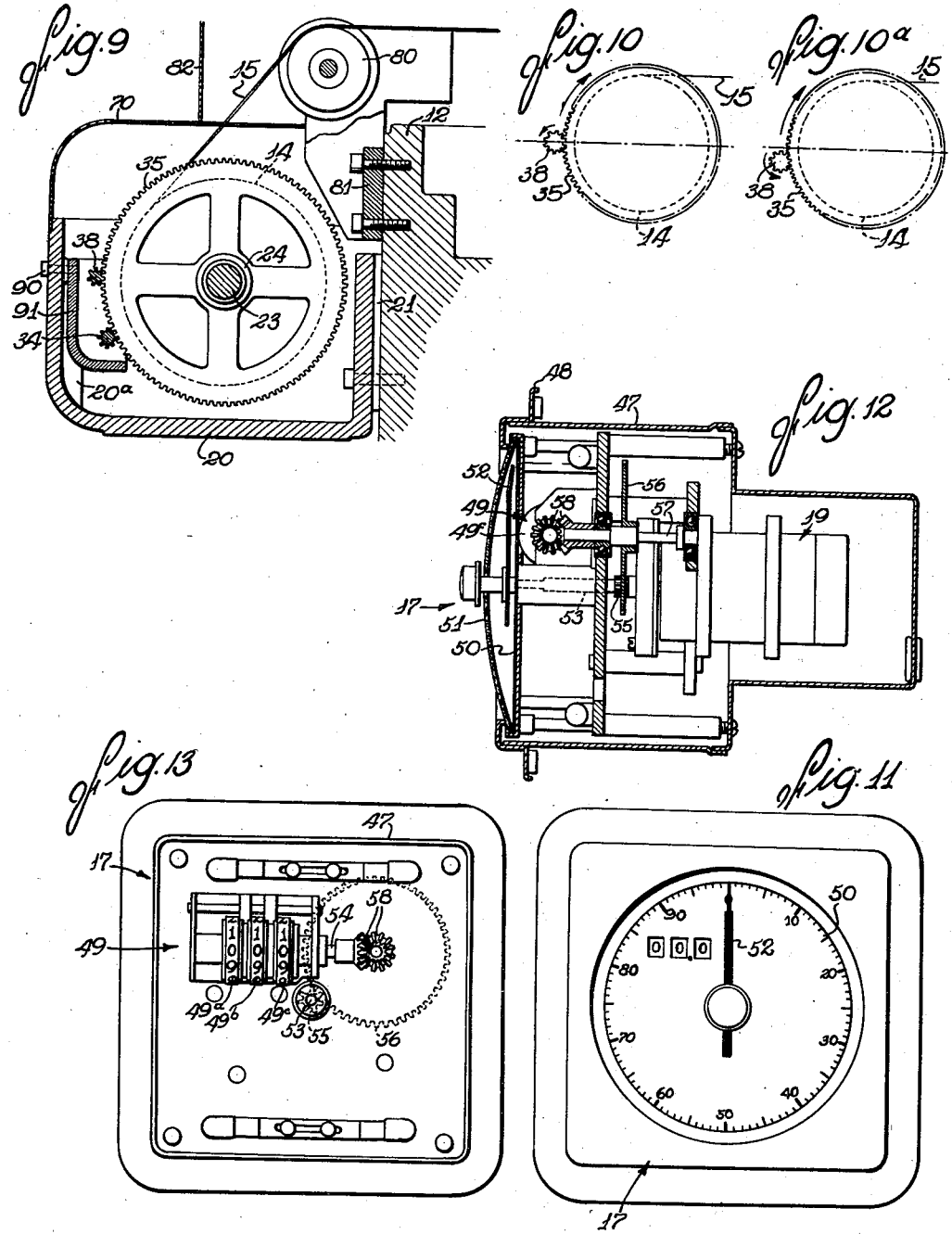

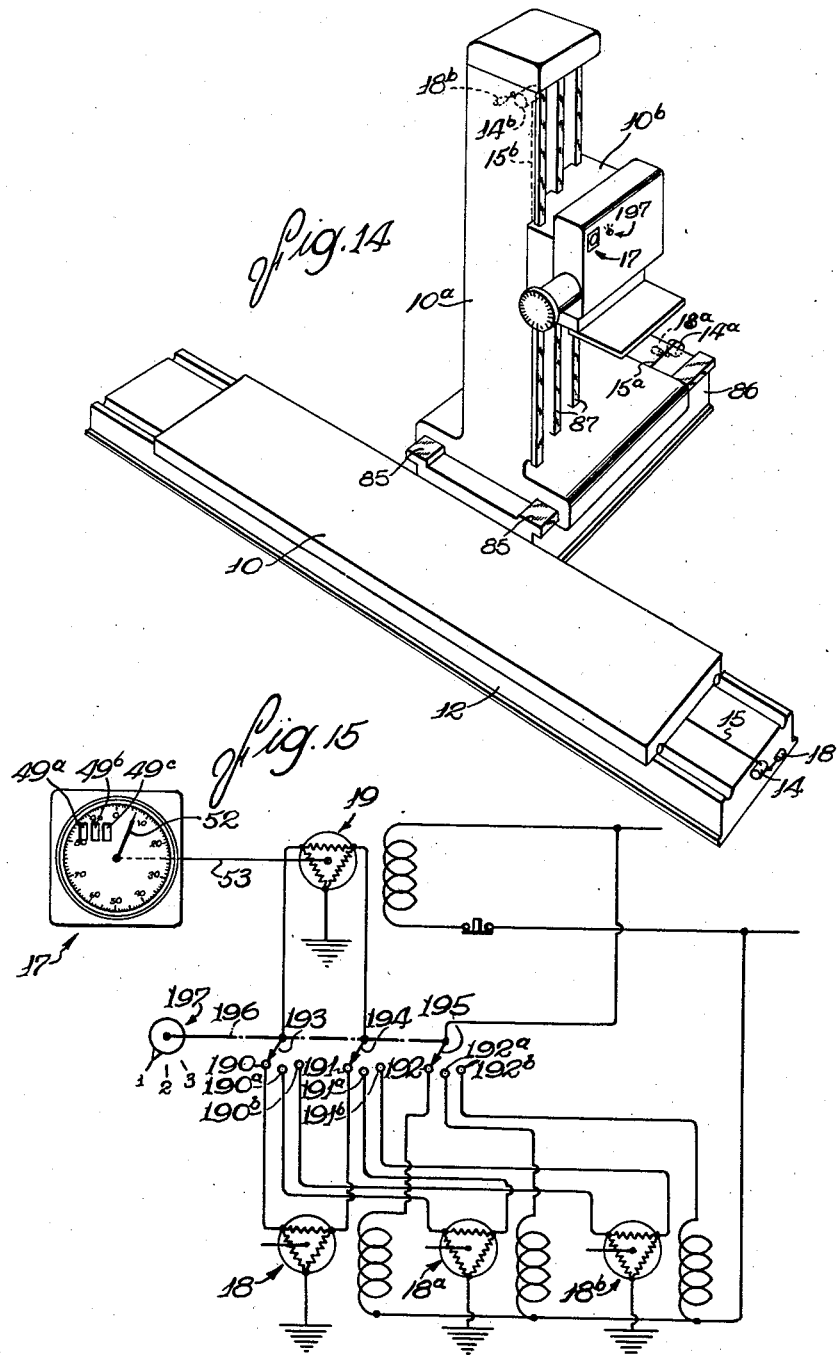

Patented Aug. 25, 1942

2,293,730

UNITED STATES PATENT OFFICE 2,293,730

MEASURING DEVICE

Eric S. Guttmann, Rockford, Ill., assignor to The Ingersoll Milling Machine Company, Rockford, Ill., a corporation of Illinois Application July 3, 1941, Serial No. 400,921

21 Claims. (Cl. 33—125)

The invention relates to a novel measuring device for making precision measurements throughout a long range.

In carrying out the invention, a flexible line is helically wrapped about a drum on one relatively movable member and a portion of the line is led from the drum and fastened to the other member. Accordingly, the rotation of the drum is proportional to the amount of line drawn in or paid out during relative movement between the members so the rotating drum can be used to drive some suitable indicator or control device.

The general object is to provide a measuring device of the above character in which the necessity for cross-traveling of the line in winding and unwinding is avoided while at the same time obtaining accuracy of measurement over ranges of many feet and simplicity and ruggedness in construction.

A more detailed object resides in the novel mounting of the drum to effect endwise movement thereof during winding and unwinding of the line while insuring perfect concentricity in the rotation of the drum.

Another object is to provide novel means for tensioning the line.

Another object is to provide in such a measuring device embodying an endwise movable take-up drum a novel arrangement for distributing throughout the range of the instrument any error which might otherwise be accumulated because of inaccuracy in the effective diameter of the drum.

The invention also resides in a novel housing or sealing arrangement for the flexible line and by means of which dirt or other foreign matter is excluded from the line.

Further objects and advantages of the invention will become apparent as the following description proceeds taken in connection with the accompanying drawings, in which Figure 1 is a fragmentary perspective view of a milling machine bed and table equipped with a measuring device embodying my invention and arranged to measure the table movement.

Fig. 1ª is an enlarged detail sectional view taken substantially along the line 1ª—1ª in Fig. 1.

Fig. 2 is a schematic layout of the parts of my measuring apparatus.

Fig. 3 is a plan view of the drum unit with its casing shown in section.

Fig. 4 is a section taken on the line 4—4 of Fig. 3.

Fig. 4ª is a detail perspective view of the mounting for the gearing connected to the drum.

Fig. 5 is a detail perspective view of this gearing.

Fig. 6 is an enlarged detail view partially in longitudinal section of the lead screw and associated parts.

Fig. 7 is a plan view of a modified form of drum unit.

Fig. 8 is a section taken on the line 8—8 of Fig. 7.

Fig. 9 is an end elevation partially in transverse section of the unit of Figs. 7 and 8.

Figs. 10 and 10ª are generally diagrammatic end elevations of a portion of the gearing of the unit of Fig. 3, showing the relative positions of such gear elements at the respective extremities of the range of axial travel of the drum.

Fig. 11 is a face view of the indicator unit for the measuring device.

Fig. 12 is a longitudinal sectional view of the indicator of Fig. 10.

Fig. 13 is a front elevation of the indicator unit with the dial and bezel removed.

Fig. 14 is a perspective view showing the adaptation of the improved measuring device to a multiple unit machine.

Fig. 15 is a schematic view and wiring diagram of the motion transmitting and indicating mechanism shown in Fig. 14.

While the invention is susceptible of various modifications and alternative constructions, I have shown in the drawings and will herein describe in detail the preferred embodiments, but it is to be understood that I do not thereby intend to limit the invention to the specific forms disclosed, but intend to cover all modifications and alternative constructions and uses falling within the spirit and scope of the invention as expressed in the appended claims.

To make plain the mode of operation of the novel measuring device herein disclosed, it has been shown as applied (Fig. 1) to the table 10 of a milling machine. It will be understood, of course, that such application is purely exemplary and that the device can be adapted to many other quite different uses. In the installation shown, the table 10 is supported by ways 11 on a bed 12 and is thus guided for endwise movement in a predetermined path and through a range of several feet. The measuring device affords not only a precise but also continuous indication of the location of the table throughout its path of travel.

The general layout of elements is shown in Fig. 2. A drum or take-up reel 14 has a flexible line 15 helically wound about it, one end of the line being anchored to the drum at 15ᵃ and the other or unreeled portion being fastened at its end to the table 10. A motor 16 connected to the drum 14 through suitable gearing yieldably urges the same to revolve in a direction to reel in the line, thereby retaining a constant tension on the line. The drum 14 is disposed at a predetermined angle so as to maintain a fixed and predetermined angle of approach of the line relative to the drum, i. e., the angle between the drum axis and the unreeled portion of the line leading away from the drum. A novel arrangement, hereinafter detailed, is provided for feeding the drum 14 endwise in timed relation with its rotation so that the unreeled portion of the line may be made to move endwise without any lateral travel of the same. Consequently, the angular rotation of the drum 14 bears a predetermined fixed relation to the movement of the table 10.

In the present instance, an indicator arrangement is provided for utilizing such rotation of the drum to indicate the position of the table in its path of travel. For this purpose, an indicator designated generally as 17 (Fig. 2) is connected to the drum 14 by means of a pair of self-synchronous electrical units so that the indicator can be located at any desired point where it will be convenient for the operator to view it. The electrical interconnection system illustrated comprises a pair of Selsyns of well known form including a transmitter 18 and a receiver 19.

Having in mind this general layout of the parts, attention may now be given to the exemplary construction of the individual elements. The line 15 has been shown, in the present instance, as comprising a length of thin steel tape. Such a steel ribbon or tape has the virtue that it is extremely flexible and yet does not stretch appreciably when subjected to sufficient tension to maintain it taut.

The drum 14 itself is comprised of a steel cylinder which can be accurately ground to a uniform diameter from end to end and with a high degree of roundness quite easily and at low cost in view of its cylindrical shape. The peripheral surface of the drum itself forms the root of the helical groove that receives the tape 15 and on which the latter is wrapped. The helical barrier between successive convolutions of the tape, and which defines the groove, can be formed by a helical spring 14ᵃ (see Fig. 3) of square cross-section which is seated in a suitable helical groove cut in the surface of the drum body.

Cocking of the drum axis D—D (see Fig. 2) at a precisely determined angle in the initial installation of the measuring device is of importance in the particular mechanism herein shown and a novel form of mounting has been provided for that purpose. As to the angle of the drum axis, it will be seen upon reference to Fig. 2 that it is cocked at an angle $a$. This angle $a$ should, in the present instance, be precisely equal to the helix angle $b$. In other words, the angle included between the drum axis and that portion of the line approaching the drum should be the helix angle of the wound tape plus ninety degrees.

To mount the drum in this manner, mounting pads on the supporting structure for the drum are adapted to be milled or otherwise trimmed off so as to locate the drum precisely in the required angle. Thus, in the illustrative construction (see Fig. 3), the drum 14 is mounted in a rectangular or box shaped frame 20 having integral mounting pads 21 on its rear face. These pads rest against flat mounting surfaces on the end of the machine bed 12. The faces of the pads 21 are milled off with a required angularity and the frame is bolted rigidly to the bed 12 so that the drum axis will be disposed in precisely the required angular position.

Next to be considered is the novel arrangement for feeding the drum 14 endwise in timed relation with its rotation. This axial movement is produced by means of a nut 22 threaded on a stationary lead screw 23 (Fig. 6). The dimensions of the threads on the nut with the screw are, however, such that they are free to move laterally with respect to each other, that is, have normal running clearances; and a suitable means, independent of the nut, is utilized for guiding the drum with precision in its longitudinal movement. As a consequence, it is possible to form the thread on the screw 23 in an ordinary thread mill and with only a normal degree of precision since any run-out of the thread or similar inaccuracy in it will not result in lack of concentricity of the drum. The pitch of the thread on the screw 23 is the same as that for the tape-receiving groove on the periphery of the drum.

To guide the drum 14 for precisely rectilinear axial movement, the exterior of the threads on the screw 23 are used as a way and coact with telescoping sleeves 24 (Fig. 6). The thread on the screw 23 is of a form which presents a flat crest in profile, a square thread being used in the present instance. The outside diameter of the screw can be accurately and easily ground to a predetermined value in an ordinary cylindrical grinder and this operation is simplified in view of the fact that it is not necessary that the axis of this outside diameter be precisely coincident with the axis of the diameter for the roots of the threads. The guide sleeves 24 are rigidly fixed to the drum 14 by screws 25 (Fig. 6) and their inner surfaces can be bored to a diameter to match the outside diameter of the screw 23 at the same time that the drum is set up on a suitable fixture for grinding its exterior surface so that the exterior surface of the drum and the interior surface of the guide sleeves 24 will be exactly coaxial. The nut 22 is held in place by the guide sleeves 24 which overlap and are soldered to the respective ends of the nut. The threads on the nut 22 and screw 23 are so dimensioned relative to each other that there will be a substantial clearance of several thousandths of an inch between the crests of the respective threads and the roots of the grooves which they enter. This may be accomplished by cutting the thread of the nut with a root diameter slightly larger than the outside diameter of the screw. Thus, the thread on the nut 22 contacts only with the flanks of the thread on the screw 23. In this way, they are effectually engaged for advancing movement of the nut along the screw as the nut rotates due to rotation of the drum, but the actual path of movement is guided and determined, quite independently of the nut, by the guide sleeves 24 running along the exterior of the screw. The screw itself is stationarily mounted in the supporting frame 20 (see Fig. 3).

From the foregoing, it will be seen that a very simple arrangement has been provided for insuring precision movement of the drum 14 in an endwise direction. Though the final result is a precision instrumentality, the component parts which go to make it up can be made by simple processes which represent, in cost, only a small fraction of what would be entailed in making a screw and nut of commensurate precision if the engagement of the screw and nut themselves was depended upon to guide the endwise movement of the drum.

The torque motor 16 for maintaining the tape taut is mounted on a bracket extension 26 (Fig. 4) on the frame 20 and housed by a sheet metal cover 27. A pinion 28 on the end of the motor shaft is located within the main frame 20 and meshes with a gear 29 (see Figs. 2 and 3). This gear 29 is fixed on a shaft 30 journaled at one end in the left hand end wall of the frame 20 and at the other end in bracket 20ª rigid with the mid portion of the front wall of the frame (Figs. 3, 4, and 5).

On the inner end of the shaft 30 is fixed a gear 31 (see Fig. 5 and also Figs. 3 and 4) meshing with an intermediate or idler gear 32 of the same size. The idler in turn meshes with a gear 33 of the same size fixed to the end of an elongated pinion 34. The latter is elongated so as to mesh at all times with a gear 35 fixed to the end of the drum 14, these elements 34—35 thus being retained in mesh irrespective of the axial displacement of the drum. The motor 16 is always energized when the instrument is in operation, tending to revolve the drum in a counter-clockwise direction (as viewed in Fig. 9) or, in other words, in a direction to tension and reel in the tape 15. The size of the motor 16 is so chosen that it will always exert a predetermined torque substantially equal to the amount of tension desired in the tape 15.

Referring now to the Selsyn system for driving the indicator 17 from the revolving drum 14, it will be seen from Figs. 3 and 4 that the transmitter Selsyn 18 is mounted on a bracket 36 at the end of the frame 20 opposite the torque motor 16 (though not fast on the frame for a reason which will hereafter appear) and is housed by a sheet metal casing 37. The driving connection for the motor of this transmitter Selsyn 18 comprises a second elongated pinion 38 fixed to the Selsyn rotor and also meshing with the gear 35, which is rigid with the drum 14. The rotor of the transmitter 18 is thus revolved in unison with the drum.

In order to avoid the necessity of using precision gears or the introduction of an error due to gear wear, the motor 16 is utilized for the additional purpose of taking up any backlash between the meshing parts 38 and 35. For this purpose, a shaft extension 39 on the pinion 38 (see Fig. 5) is connected to the motor driven gear 31 by a leaf spring 40. This spring 40 is pivotally connected at one end to the shaft 39 and at the other end to an eccentric pin 41 on the gear 31. The effect of the spring connection is to exert a constant bias on the pinion 38 greater than the torque required to drive the Selsyn 18. By such preloading of the spring, there is never any backlash between its teeth and those of the gear 35.

As heretofore noted, the transmitter 18 and receiver 19 may be ordinary Selsyns which are of well known construction. In brief, they comprise polyphase rotors which are delta wound and interconnected by leads 42. In addition, they include field windings 43 and 44 respectively energized in parallel from a suitable source of alternating current indicated by the supply lines 45. A normally closed push button switch 46 serves to open the circuits and stop them at will. Any rotation of the rotor of the transmitter 18 results in a rotation of the rotor of the receiver 19 through the same total angular distance.

Of particular significance in the gearing arrangement described above is the use of separate driving and driven members or pinions for the drum 14, that is, in the particular construction shown, the use of the separate pinions 34 and 38 which are respectively utilized to revolve the drum for reeling in the line and to form a driven connection from the drum for actuating the indicator. This arrangement aids materially in improving the accuracy of the instrument. More particularly, first note that the driven pinion 38 must have an unsupported length between its end bearings equal at least to the range of endwise travel of the drum, thus necessitating the us of a long slender pinion that inherently has a strong susceptibility to bending when loaded between its ends. On the other hand, the motor 16 may be required to apply a force of several pounds at the periphery of the drum to keep the tape 15 taut. Under such circumstances, if the motor 16 were connected directly to the output or driven pinion 38, the force applied to the latter at its point of engagement with the gear 35 would tend to cause bending of this long pinion, particularly when the point of its engagement with the gear 35 was at about midway of the length of the pinion, or, in other words, when the drum is about midway of its path of endwise movement. Such bending of the pinion 38 would, of course, introduce an intolerable error in the accuracy of the instrument. This difficulty is completely overcome by the gearing arrangement heretofore described. With the latter arrangement, the motor 16 can be utilized to apply any desired torque to the drum through the driving pinion 34, but since the other or driven pinion 38 is structurally separate, the only torque or load applied to the pinion 38 will be the small amount requisite to revolve the rotor of the transmitter 18. The spring 40 does, it is true, connect the torque motor 16 and the driven pinion 38, but it affords a yieldable connection for transmitting only the slight torque required to take up backlash. Consequently, since the driven pinion 38 is not subjected to the full torque of the motor 16, any bending of the driven pinion 38 is substantially obviated and error in the operation of the instrument from such cause is eliminated.

Provision has also been made in the present instrument for compensating for unavoidable errors in the effective diameter of the drum. It will be understood that in calculating the dimensions of the parts for the instrument that the "effective diameter" of the drum is its outside diameter plus the thickness of the tape. This effective diameter may, in actuality, vary slightly from its specified or desired value either because the tape is not of the specified thickness or because the drum is not ground to exactly the specified diameter. As to the latter, it should be understood that it is a comparatively simple matter to grind the drum surface in such manner that its diameter is, for present purposes, uniform from end to end but that it is comparatively quite difficult to obtain any particular diameter within a 0.0001 of an inch of the desired value. Even such a small error as 0.0001 inch in diameter may, particularly in a drum having a large number of convolutions as here contemplated, result in a cumulative error of registration of several thousandths of an inch throughout the full range of the instrument. The compensating arrangement herein provided is adapted to compensate for any such otherwise accumulated error.

In general, the procedure utilized in accomplishing the compensation noted above is to effect a small predetermined and progressive variation in the ratio of the angular movements of the drum 14 and driven pinion 38 throughout the range of the instrument. In other words, if the drum is slightly oversized, so that it would therefore reel in more than the calculated amount of line during each revolution of the drum, the corresponding rotation of the driven pinion 38 and therefore of the indicator 17 is increased by an amount just sufficient to compensate. On the other hand, if the drum is slightly undersized, each revolution of the drum will cause less than the calculated amount of tape to be reeled in and, accordingly, the corresponding angular rotation of the driven pinion 38 is diminished by an amount just sufficient to compensate.

The desired variations in the ratio of motion transmission between the drum 14 and the indicator are effected, in the present instance, by varying the angular relation of the axes of the drum and the pinion 38. In particular, the pinion is mounted, by means of a bracket arrangement hereinafter described so that it can be adjustably swung about a pivot pin or screw 90 (Fig. 3) at its inner end. The pinion 39 can thus be swung generally vertically up or down about its inner end and relative to the horizontal axis of the meshing gear 35 on the drum 14 and therefore moved out of parallelism with elements of the drum or gear circumferences while still maintaining the same meshing relation between the gear and pinion. The effect of such adjustment can best be understood upon reference to Figs. 10 and 10ª. Let it be assumed, first of all, that the pinion 38 has been swung down slightly about the pivot pin 90. In such case, when the drum 14 is at the extreme left hand end of its path of travel (as viewed in Fig. 3), the gear 35 will be in engagement with the left hand end of the pinion 38, and the axis of the gear 35 will be substantially horizontally alined with the axis of the portion of the pinion 38 which it is engaging as shown in Fig. 10. This relation exists irrespective of the position of the other end of the pinion 38 because of the location of the pivot 90. When, however, the drum 14 is moved to the other or right hand extremity of its path of movement, the portion of the pinion 38 with which the gear 35 meshes will be displaced downwardly below the position indicated in Fig. 10ª. That is to say, for each revolution of the drum, the motion transmitted to the indicator is increased by the increment of displacement of the pinion below the drum axis. Thus, by lowering the movable end of the pinion, the indicator reading is increased correspondingly and this increase is progressive throughout the range of axial movement of the drum. This adjustment of the pinion may be utilized to compensate for an oversize of the drum, the degree of tilting of the pinion being determined by the amount the drum is oversize. Conversely, undersizing of the drum may be corrected for by tilting the pinion 38 reversely, that is, in the direction of rotation of the drum as the tape is paid out or upwardly as viewed in Fig. 10.

The actual determination of the amount and sense of the angle noted above is a fairly simple matter. For this purpose, the instrument is installed on the machine and the pinion 38 arranged so that its axis exactly parallels that of the drum 14. The tape 15 is reeled in on the drum 14 and the indicator 17 set at zero. Then, the tape is reeled out to approximately its full extent and the distance which its free end has moved is measured accurately by some independent measuring system such, for example, as by the Johansson block method. This independently measured distance is then compared to the reading of the indicator 17 to see if the latter is correct. If there is some variation in the effective diameter of the drum from its design value, there may be an error in the indicator registration of a few thousandths of an inch. In such a case, the driven pinion 38 is swung about the pivot 90 either upwardly or downwardly in a direction and by an amount such that the indicator is caused to register exactly the correct distance as measured by the Johansson block method. Then, the pinion 38 is, of course, fixed in this adjusted position and thereafter the instrument will register correctly.

A special mounting bracket has been provided for the pinion 38 in order to accommodate the adjusting movement described above. This mounting bracket also carries the driving pinion 34 so that it will be adjusted in position coincidently with shifting with the driven pinion 38 and thus remain properly in mesh with the gear 35. In particular, the mounting bracket for the pinions 34 and 38 comprises an elongated bar 91 (Fig. 4ª as well as Figs. 3 and 4) of L-shaped cross-section having a pair of longitudinally spaced transverse members 93 and 94 rigid with its left hand end. The pinions 34 and 38 are journaled in suitable bearings mounted in the apertured members 92 and 93. The idler pinion 32 and the meshing pinion 33 are journaled in bearings mounted in the apertured member 94. The pivot screw 90 is threaded in a hole 95 adjacent the left hand end of the supporting bracket so that the latter can be swung about this pivot and clamped in adjusted position by screws 97 passing through slots 98 in the frame 20 and threading into the bar 91. The bracket 36 which carries the Selsyn transmitter 18 is rigid with a flange 92 on the bar 91 so that any adjustment of the position of the driven pinion 38 does not interfere with its proper driving connection to the Selsyn.

In order to adjust the position of the driven pinion 38 for compensating purposes as heretofore described, it is only necessary to loosen the bolts 97 and shift the pinion and its mount about the pivot 90 by such an amount as may be required. Through the use of the mounting arrangement described, proper mesh can be retained between the pinions 34, 38 with the gear 35 as well as between the pinions 32 and 33. The resultant alteration in mesh between the pinions 31 and 32 is inconsequential since the pinion 32 is simply an idler in the torque-applying connection to the drum, and the pivotally connected leaf spring 40 permits a fairly wide latitude of movement between the elements 41 and 39 which it connects (see Fig. 5).

A suitable construction for the indicator unit 17 driven by the receiver 19 is illustrated in Figs. 11 to 13. The entire mechanism, including the receiver 19, is housed within a sheet metal casing 47 having a mounting flange 48 by means of which it can be fixed in any desired position on the machine. Since the mechanism in the housing 47 is connected to the rest of the measuring apparatus simply by a flexible electric conductor cable, complete freedom of location for the indicator is afforded.

The illustrated indicator 17 is adapted to register in inches and decimal fractions thereof down to and including thousandths. For this purpose, it includes a multi-wheel type revolution counter designated generally as 49 which is of well known construction and comprises three counter wheels 49$^a$, 49$^b$, and 49$^c$. Each of these wheels has digits on its periphery from zero to nine both inclusive. One revolution of the wheel 49$^c$ causes the next wheel 49$^b$ to turn one-tenth of a revolution and, similarly, each revolution of the wheel 49$^b$ causes the next wheel 49$^a$ to turn one-tenth of a revolution. The wheel 49$^b$ registers inches, the wheel 49$^a$ registers tens, and the wheel 49$^c$ registers tenths. The periphery of the counter wheels 49$^a$ to 49$^c$ are exposed through a suitable aperture in a dial 50 located behind a transparent bezel 51 in the front of the case 48. The dial 50 has a circular scale graduated in hundredths and thousandths of an inch on which a revolving needle or pointer 52 registers. Thus, by reading the numbers exposed on the counter wheels and the reading of the needle 52, the operator can, at a glance, obtain the total precise reading down to a thousandth of an inch.

The drive shaft 53 (Figs. 12 and 13) of the receiver 19 is directly connected to the needle 52, the needle being carried on the outer end of such shaft. On the other hand, the receiver drive shaft 53 is connected to the shaft 54 of the multi-wheel counter 49 by a pinion 55 meshing with a gear 56. The latter gear 56 is carried on a shaft 57 which is in turn connected through bevel gears 58 with the revolution counter's shaft 54.

The general mode of operation of the measuring device will by now be apparent. By way of recapitulation, it may be noted that to condition the device for operation, it is necessary simply to supply current to the motor 16 and to the supply line 45 for the Selsyns 18, 19. Thereafter, as the table 10 moves back and forth on its ways 11, the indicator 17 registers continuously and with extreme precision the exact location of the table. Thus, as the table moves, the tape 15 is correspondingly reeled in or out from the drum 14 and the latter revolved. As the drum revolves, it is fed endwise in timed relation so that the tape 15 is maintained with a fixed angle of approach to the drum. Consequently, the degree of angular rotation of the drum is directly and precisely proportional to the displacement of the outer end of the tape which is fixed to the table 10. The indicator 17, which is driven by a revolving drum is calibrated to register, in suitable units of linear measure, the displacement of the outer end of the tape or, in other words, the location of the movable machine tool element to which it is secured.

In an apparatus of the type described, it is particularly necessary to protect the drum 14 and tape 15 against dirt or other foreign matter. It will, of course, be clear that if dirt should become lodged on the contacting tape or drum surfaces, it would, in effect, vary the effective diameter of the drum and hence destroy the accuracy of registration of the instrument. To house the drum 14 itself a sheet metal cover 70 (shown in Fig. 4 and indicated in broken lines in Fig. 1) is used to cover the open top of the box frame 20. The portion of the tape 15 extending longitudinally of the machine bed 12 is received within a tubular housing fixed to this bed. This housing (see Figs. 1 and 1$^a$) comprises a longitudinal rib 71 on the bed and to which is fixed a sheet metal member 72 of L-shaped cross section. Thus, one leg or wall of the member 72 is fixed to the upper edge of the rib 71 while the lower edge of the other leg extends down into a groove 73 in the bed 12. This groove 73 is filled with oil or other suitable sealing liquid. A bracket 74, fixed on the table 10, is shaped to extend down through the body of liquid in the groove 73 and project up into the sealed space defined by the housing members 71 and 72. The tape 15 is fixed to the inner end of this bracket. The length of tape extending along the bed of the machine is thus effectually housed and protected from chips or other foreign matter, which might fall on it, as well as from mechanical damage. As the tape emerges from the housing on the machine bed it passes through a wiper 75 comprising a pair of felt pads fixed to a bracket 76. Any dust which may possibly seep in onto the tape is thus removed by the wiper.

In some instances, it may be desirable to lead the unreeled portion of the tape over an intermediate idler roller 80 (see Figs. 7, 8, and 9) in order, for example, that the drum unit may be located below the plane in which the free end portion of the unreeled tape moves. For such an application, it is necessary, for the reasons previously mentioned, to position the drum axis so that the unreeled portion of the tape between the points of contact between the drum and the idler roller be maintained at an angle differing from a right angle by an angle equal to the helix angle of the wound tape. To accomplish this and at the same time prevent buckling of the tape at the points of contact with the drum and the roller, the drum axis is tilted not only horizontally as shown in Fig. 7 but also vertically as shown in Fig. 8. That is to say, the resultant direction of tilting of the drum axis to obtain the desired angle is controlled by the direction of that portion of the tape between the roller and the drum.

The measuring apparatus above described facilitates the precise measurement of a plurality of different motions from a single remote point of control. Such an adaptation is illustrated in Figs. 14 and 15 which show a machine tool having a table 10, a column 10$^a$, and a saddle 10$^b$ the separate motions of which may be read on a single indicator 17 of the character described above located in this instance at a traveling control station on the front of saddle 10$^b$. As before, the table 10 is slidable along a horizontal bed 12 and its motions are transmitted through the tape 15 and converted into rotary motion of the drum 14 which correspondingly turns the rotor of the Selsyn transmitter 18. The latter is connected to the receiving Selsyn 19 mounted in the saddle 10$^b$ and arranged to drive the indicator 17 in the manner previously described.

The column is mounted at one side of the table to slide toward and away from the latter along ways 85. Its motion is communicated through a tape 15$^a$ to a drum 14$^a$ mounted in the manner above described, preferably at the end of the column bed 86 remote from the table. Rotary motion of the drum produces corresponding rotation of the rotor of a Selsyn transmitter 18$^a$ precisely in accordance with the column movement. In a similar way, vertical movement of the saddle 10$^b$ along ways 87 on the column is communicated through a tape 15$^b$ to a drum 14$^b$ mounted at the upper end of the column. This drum drives a Selsyn transmitter 18ᵇ. The drums 14ᵃ and 14ᵇ are constructed and mounted in the same manner as the drum 14 and each unit is equipped with the mechanism previously described for correcting for errors due to dimensional inaccuracies inherent in the drum and other parts. Thus, each unit is adjusted to incorporate the correction necessary for making the Selsyn rotors turn through precisely one revolution for each one-tenth inch of travel of its associated machine element.

Switching means is provided for associating any selected one of the transmitting Selsyns with the receiving Selsyn 19 by which the indicator 17 is actuated. To this end, one rotor and one stator terminal of each transmitter and the corresponding terminals of the receiver are connected as by grounding. The other stator and rotor terminals of the respective transmitters are respectively connected to contacts 190, 191, and 192 which are engageable by movable contacts 193, 194, and 195 on a shaft 196 operable by a control knob 197. With the latter positioned as shown in Fig. 15, the transmitter 18 is connected to the receiver 19 and the indicator is conditioned to register the movements of the table 10. In the next position of the knob 197, the transmitter 18ᵃ is associated with the indicator and the movements of the column 10ᵃ are registered. The saddle movements are indicated with the selector knob in its third position. Upon a change from one machine element to another, the receiving Selsyn and the indicator assume definite positions corresponding to that of the selected transmitting Selsyn. After resetting the indicator to zero, the movements of the selected element will be registered precisely on the indicator scales.

I claim as my invention:

1. In an apparatus of the type described, the combination of a drum having a flexible line wrapped helically about the same with one end led therefrom for rotation of the drum as the line is reeled in or paid out, a stationary screw coaxial with the drum, a nut on the drum threaded on said screw, means guiding said drum for precisely rectilinear axial movement and supporting the same with said nut engaging only the flanks of the thread of said screw, and the pitch of the thread on said screw being substantially equal to the pitch of the helix of the line about the drum whereby the nut turning on the screw as the drum revolves to pay out or reel in the line causes the drum to move endwise in timed relation to the reeling of the line and thereby maintain a constant angle of approach for the line relative to the drum axis.

2. In an apparatus of the type described, the combination with a take-up reel for a flexible line of, a stationary screw and a nut threaded on the screw and fixed to the reel substantially with the latter, said nut and screw having square threads dimensioned with the nut thread cut on a larger root diameter than the screw, the outer surface of said screw being accurately finished and coacting with said reel to guide the reel for precise endwise movement as the nut revolves on the screw.

3. In an apparatus of the type described, the combination with a take-up drum adapted to have a flexible line wrapped about it of, a screw, a nut threaded on the screw and carried by the drum substantially coaxially with the latter and at a point intermediate its ends, the mating threads of said screw and nut being dimensioned to afford some degree of lateral play between the nut and screw and the periphery of the screw being accurately finished to a uniform value substantially from end-to-end thereof, and a pair of guide sleeves rigid with said drum having internal bores precisely coaxial with the drum and telescoped over said screw to slide therealong, said sleeves being disposed on respective opposite sides of said nut longitudinally of the drum and having a close sliding fit on the screw.

4. In an apparatus of the character described, the combination of a shaft having an accurately machined external surface, a take-up reel for a flexible line supported on said surface and guided thereby for axial movement, a thread on said shaft, and means on said reel engaging the side of said thread and causing axial feeding of said reel along said shaft during rotation of the reel.

5. In an apparatus of the type described, the combination of a rotary drum adapted to have a flexible line partially reeled thereon, a shaft rotatably supporting said drum and accurately guiding the same for endwise movement, and surfaces on the drum and shaft separate from the supporting surface of the shaft and coacting during rotation of said drum to feed the drum axially.

6. In an apparatus of the type described, the combination of a rotary drum adapted to have a flexible line partially reeled thereon, a gear fixed on said drum and rotatable with it about the drum axis, means for feeding the drum and gear assembly axially in timed relation with its rotation, an elongated driven pinion disposed to mesh with said gear throughout the range of axial travel of the drum, and means for applying to said drum independently of said pinion a biasing force tending to revolve the drum in a direction to reel in said line.

7. In an apparatus of the type described, the combination with a rotary member adapted to have a flexible line partially reeled thereon, of a revoluble gear operatively connected to said member to turn in unison therewith, a toothed driven element meshing with said gear, biasing means including a toothed element meshing with said gear for yieldably urging the latter to revolve in a direction to turn said member to reel in the line, and a driven toothed element also meshing with said gear but structurally separate from the first mentioned toothed element, whereby said driven element remains substantially unloaded by the force applied from said biasing means.

8. In an apparatus of the type described, the combination of a rotary drum adapted to have a flexible line partially reeled thereon, a gear fixed on said drum and rotatable with it about the drum axis, means for feeding the drum and gear assembly axially in timed relation with its rotation, an elongated driven pinion disposed to mesh with said gear throughout the range of axial travel of the drum, an elongated drive pinion also disposed to mesh with said gear throughout the range of axial travel of the drum, and biasing means for yieldably urging said drive pinion to turn in a direction to cause the drum to reel in the line.

9. In an apparatus of the type described, the combination of a rotary drum, a flexible line partially reeled thereon, a gear fixed on said drum and rotatable with it about the drum axis, means for feeding the drum and gear assembly axially in timed relation with its rotation, an elongated driven pinion disposed to mesh with said gear throughout the range of axial travel of the drum, an elongated drive pinion also disposed to mesh with said gear throughout the range of axial travel of the drum, biasing means for yieldably urging said drive pinion to turn in a direction to cause the drum to reel in the line, and means forming a yieldable drive connection from said biasing means to said driven pinion for preventing backlash between said driven pinion and gear.

10. In an apparatus of the type described, the combination of a rotary drum, a flexible line partially reeled thereon, a gear operatively connected to said drum to turn in unison with it, a toothed driven member meshing with said gear, a biasing device, means connecting said biasing device to the drum independently of said driven member for urging the drum to turn in a direction to reel in the line, and means forming a yieldable connection from said biasing device to said driven member for preventing backlash between the latter and said gear.

11. In an apparatus of the type described, the combination of a rotary drum, a flexible line wound helically around the drum periphery, a gear operatively connected to said drum to turn in unison therewith, means for feeding said gear axially in timed rotation with the drum, an elongated pinion meshing with said gear throughout the latter's range of axial travel, means supporting said pinion with its axis generally tilted out of parallelism relative to the gear circumference by an amount of lead proportional to the deviation of the effective diameter of the drum from a predetermined value, and indicating means actuated in accordance with the rotation of said pinion.

12. In an apparatus of the type described, the combination of a rotary drum adapted to have a flexible line partially reeled thereon, a gear operatively connected to said drum to turn in unison therewith, a pinion meshing with said gear, means for effecting a relative axial feeding movement between the gear and pinion in timed relation to the rotation of said drum, the last mentioned elements remaining in mesh throughout such feeding movement, means supporting said gear and pinion with their axes cocked at a predetermined angle relative to each other proportional to the deviation of the effective drum diameter from a predetermined value, and indicating means actuated from said pinion.

13. Apparatus of the character described comprising, in combination, a rotary drum, a line wound helically thereon, means for effecting relative movement between the free end of said line and the drum axis to maintain a constant angle between the drum axis and the unwound portion of the line adjacent the drum, an indicator, and a driving connection between said drum and said indicator having a drive ratio varying progressively as the line is paid out or wound back onto the drum, the direction and amount of such variation compensating for the oversize or undersize of said drum.

14. In an apparatus of the type described, the combination of a rotary drum having a flexible line wrapped helically about the same with a portion of the line led laterally away from the drum, means for feeding the drum axially in timed relation with its rotation to prevent lateral travel of said portion of the line leaving the drum as it is paid out or drawn in, indicating means, and means connecting said drum and said indicating means to transmit the rotary motion of said drum to the indicating means in a ratio which varies progressively by an amount compensating for the undersize or oversize of the drum.

15. Apparatus of the character described comprising, in combination, a rotary drum, a line wound helically thereon, means for effecting relative movement between the free end of said line and the drum axis to maintain a constant angle between the drum axis and the unwound portion of the line adjacent the drum, an indicator, and a driving connection between said drum and said indicator incorporating means operable automatically to effect a progressive variation in the ratio of motion transmission from the drum to the indicator as the line is paid out or wound back onto the drum.

16. Apparatus of the character described comprising, in combination, a rotary drum, a line wound helically thereon, means for effecting relative movement between the free end of said line and the drum axis to maintain a constant angle between the drum axis and the unwound portion of the line adjacent the drum, an indicator, a driving connection between said drum and said indicator comprising two constantly meshing gear elements mounted with their axes out of parallelism and one movable axially as the line is paid out or wound back onto the drum.

17. In an apparatus of the type described, the combination of a drum having a flexible line helically wrapped about the same, a pulley disposed laterally of the drum, the line being led from said drum over the pulley, and means for feeding the drum endwise in timed relation with its rotation to prevent lateral travel of the portion of the line between the drum and said pulley as it is drawn in or paid out.

18. In an apparatus of the type described, the combination with an elongated flexible line, of an elongated housing for the same having an entry opening extending along the housing, a member movable along the housing and extending through said entry and connected to the line, and means forming a liquid seal for said entry opening.

19. In an apparatus of the type described, the combination of an elongated flexible line movable generally endwise in unison with a member whose displacement is to be measured, an elongated housing for said line, means defining an open-top liquid-receiving vessel extending substantially from end-to-end of said housing, said housing having one side wall extending down into said vessel beneath the normal liquid level therein to a point short of the vessel bottom, and an attachment member fixed to said line and extending out of said housing laterally through said vessel in the clearance space between the lower edge of said housing wall and vessel bottom.

20. In an apparatus of the type described, the combination of a rotary drum having a flexible line wrapped helically about the same with a portion of the line led laterally away from the drum for turning of the drum as such portion of the line is drawn in or paid out, means supporting said drum and the unreeled line for relative movement along a predetermined path with the portion of the line adjacent said drum constantly disposed at an angle differing from a right angle by the helix angle of the wound portion of the line, means for feeding the drum axially in timed relation with its rotation to prevent lateral travel of the portion of the line leaving the drum as it is paid out or drawn in, and indicating means actuated in accordance with the rotation of said drum to indicate the relative displacement of the drum and the free end of said line.

21. Apparatus for indicating precisely the movement of any one of a plurality of independently movable machine elements comprising, in combination, a plurality of self-synchronous electrical transmitters each having inductively related primary and secondary members, separate means actuated in accordance with the movements of the respective machine elements and each operable to turn a member of one of said transmitters precisely through a predetermined angle for each unit of movement of the actuating machine element, a self-synchronous electrical receiver, switching means selectively operable to connect any one of said transmitters with said receiver, and mechanism actuated by said receiver and operable to indicate the precise displacement of the selected machine element.

ERIC S. GUTTMANN.